United States Patent
Geber et al.

(10) Patent No.: US 9,725,005 B2
(45) Date of Patent: Aug. 8, 2017

(54) CIRCUIT FOR CONTROLLING AN ELECTRIC VEHICLE PILOT SIGNAL LEVEL FOR CONNECTOR DISCONNECT

(71) Applicant: CHARGEPOINT, INC., Campbell, CA (US)

(72) Inventors: Charles R. Geber, Los Gatos, CA (US); Richard Lowenthal, Cupertino, CA (US); David Baxter, Monte Sereno, CA (US)

(73) Assignee: CHARGEPOINT, INC., Campbell, CA (US)

( * ) Notice: Subject to any disclaimer, the term of this patent is extended or adjusted under 35 U.S.C. 154(b) by 1059 days.

(21) Appl. No.: 13/715,782

(22) Filed: Dec. 14, 2012

(65) Prior Publication Data

US 2014/0002020 A1 Jan. 2, 2014

Related U.S. Application Data

(60) Provisional application No. 61/576,345, filed on Dec. 15, 2011.

(51) Int. Cl.
  *B60L 11/18* (2006.01)

(52) U.S. Cl.
  CPC ....... *B60L 11/1838* (2013.01); *B60L 11/1818* (2013.01); *B60L 11/1824* (2013.01); *B60L 11/1846* (2013.01); *B60L 2210/30* (2013.01); *B60L 2270/32* (2013.01); *B60L 2270/34* (2013.01); *Y02T 10/7005* (2013.01); *Y02T 10/7072* (2013.01); *Y02T 10/7241* (2013.01); *Y02T 90/121* (2013.01); *Y02T 90/127* (2013.01); *Y02T 90/128* (2013.01); *Y02T 90/14* (2013.01); *Y02T 90/163* (2013.01); *Y02T 90/169* (2013.01); *Y04S 30/14* (2013.01)

(58) Field of Classification Search
  CPC .............. B60L 11/1818; B60L 11/1846; B60L 11/1838; B60L 11/1824; B60L 2210/30; B60L 2270/32; B60L 2270/34; Y04S 30/14; Y02T 10/7005; Y02T 10/7241; Y02T 90/163; Y02T 90/169; Y02T 90/121; Y02T 90/14; Y02T 90/128; Y02T 90/127
  USPC ......................................... 307/9–11; 320/109
  See application file for complete search history.

(56) References Cited

U.S. PATENT DOCUMENTS

| | | | |
|---|---|---|---|
| 2011/0037317 A1* | 2/2011 | Kuschnarew et al. | 307/9.1 |
| 2011/0216453 A1* | 9/2011 | Haines | H02H 9/00 361/49 |

(Continued)

OTHER PUBLICATIONS

Machine translation of JP 2010161910 A; Nakamura, Hideji; Jul. 2010.*

*Primary Examiner* — Jared Fureman
*Assistant Examiner* — James P Evans
(74) *Attorney, Agent, or Firm* — Nicholson De Vos Webster & Elliott LLP

(57) ABSTRACT

An apparatus in an electric vehicle for controlling an electric vehicle pilot signal level includes proximity detection circuitry for detecting when a proximity switch in an electric vehicle connector is actuated, and pilot level-control circuitry for signaling an electric vehicle supply equipment coupled with the electric vehicle to remove charging voltage from the electric vehicle connector responsive to the proximity detection circuitry detecting that the proximity switch in the electric vehicle connector is actuated.

18 Claims, 4 Drawing Sheets

(56) References Cited

U.S. PATENT DOCUMENTS

2012/0022811 A1\* 1/2012 Dickinson et al. ............ 702/60
2013/0076368 A1\* 3/2013 Bianco .................. G01R 31/00
  324/510

\* cited by examiner

CIRCUIT FOR CONTROLLING AN ELECTRIC VEHICLE PILOT SIGNAL LEVEL FOR CONNECTOR DISCONNECT

CROSS-REFERENCE TO RELATED APPLICATIONS

This application claims the benefit of U.S. Provisional Application No. 61/576,345, filed Dec. 15, 2011, which is hereby incorporated by reference.

FIELD

Embodiments of the invention relate to the field of charging electric vehicles; and more specifically, to controlling an electric vehicle pilot signal level for connector disconnect.

BACKGROUND

SAE J1772, which is a standard for electrical connectors for electric vehicles, describes the use of an electrical signal referred to as the pilot signal that is sourced by the Electric Vehicle Supply Equipment (EVSE) (sometimes referred herein as an "electric vehicle charging station") that can perform one or more of the following functions: verifies that the electric vehicle is present and connected to the EVSE, permits energization/de-energization of the supply, transmits available supply current to the electric vehicle, monitors the presence of the equipment ground, and specifies vehicle ventilation requirements.

SAE J1772 also describes detecting the presence of the connector in the vehicle inlet (referred to as "proximity detection"). SAE J1772 also describes that the proximity detection circuit may be used to provide a signal in the vehicle charge control strategy to help reduce electrical arcing of the coupler during disconnect. Arcing causes cumulative negative impacts such as the pitting of the contacts leading to greater contact resistance, which in turn raises the heating in the connector which can lead to the connector shell melting. The arc itself can also lead to heat that can cause damage to the connector shell. Also, a previously pitted connector can cause damage to an otherwise pristine mating connector when operating under normal conditions.

Such use of a proximity detection circuit is not mandatory to be compliant with SAE J1772. Thus, electric vehicle on-board charging systems can be designed to be compliant with SAE J1772 without implementing such a feature.

Traditionally, on-board charging systems are able to turn off current flow before the connector is removed from the vehicle inlet in one of two ways. The first is to turn off the Insulated Gate Bipolar Transistors (IGBTs) in the on-board charging system thereby halting the flow of current. The second way is to raise the voltage level of the pilot signal's positive phase from 6V to 9V, which signals the EVSE to open its contactor to de-energize the connection. Although SAE J1772 suggests that a proximity detection circuit can be used to provide a signal in the vehicle charge control strategy to help reduce electrical arcing of the connector during disconnect, SAE J1772 does not describe how this is implemented.

BRIEF DESCRIPTION OF THE DRAWINGS

The invention may best be understood by referring to the following description and accompanying drawings that are used to illustrate embodiments of the invention. In the drawings.

DESCRIPTION OF EMBODIMENTS

In the following description, numerous specific details are set forth. However, it is understood that embodiments of the invention may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

A circuit for controlling an electric vehicle pilot signal level for connector disconnect is described. In one embodiment of the invention, a proximity detection and pilot level-control circuit that is independent of any power supply, detection circuits, or control logic within the on-board charging system of an electric vehicle, detects when a connector latch release actuator is actuated to remove a connector from an electric vehicle inlet, and responsive to that detection, causes the voltage of the pilot signal to change which signals the electric vehicle supply equipment (EVSE) to open its contactor to remove charging voltage from the connector. As a result, the subsequent removal of the connector from the electric vehicle inlet induces no arcing due to the absence of voltage and current at the contacts of the connector.

Figure 1:
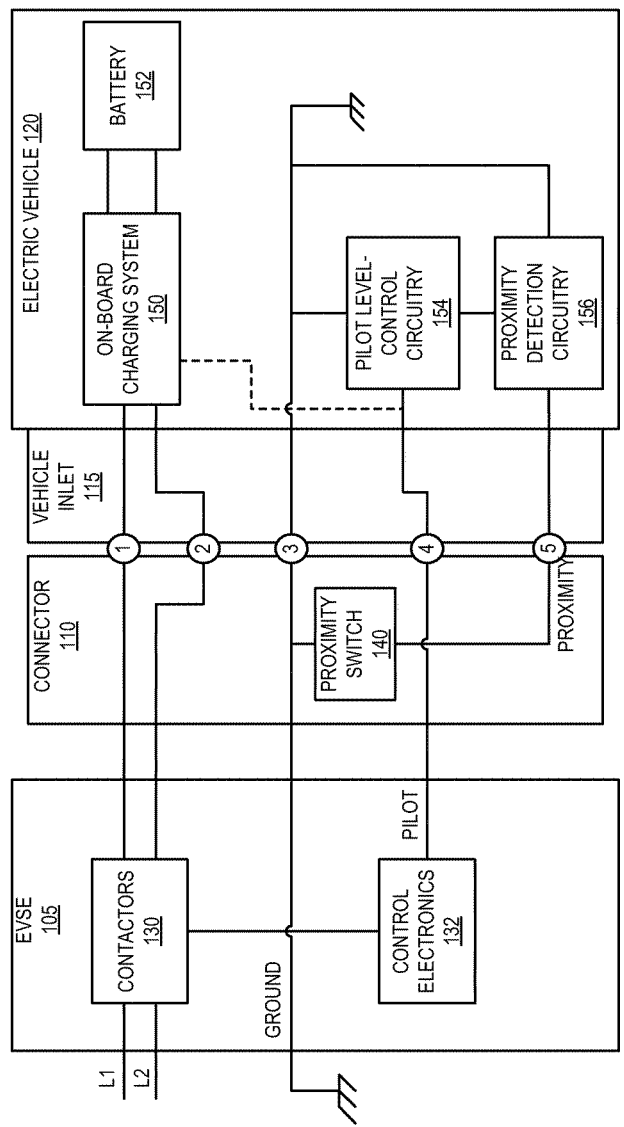
FIG. 1 illustrates an exemplary electric vehicle charging system that uses a proximity detection and pilot level-control circuit according to one embodiment.

FIG. 1 illustrates an exemplary electric vehicle charging system that uses a proximity detection circuit and pilot level-control circuit according to one embodiment. The EVSE 105 which is sometimes referred to as an electric vehicle charging station, is used for delivering energy to electric vehicles for charging. In one embodiment, the EVSE 105 is compliant with the SAE J1772 standard.

As illustrated in FIG. 1, the EVSE 105 includes the contactors 130 and the control electronics 132. The control electronics 132, among other things, cause the contactors to open and close to deliver energy to the electric vehicle. The control electronics 132 also includes circuitry for sourcing a control pilot signal. The control pilot signal can be used to perform one or more of the following functions: verify that an electric vehicle is present and connected to the EVSE, permits energization/de-energization of the power supply, transmits available supply current to the electric vehicle, monitors the presence of equipment ground, and specifies vehicle ventilation requirements.

The voltage of the pilot signal is used by the EVSE 105 to designate different electric vehicle states. For example, the SAE J1772 standard describes 6 vehicle states, represented by different voltages of the pilot signal. In particular, the SAE J1772 describes state A (an electric vehicle is not connected) that is represented by 12 volts, state B (an electric vehicle is connected but not ready to accept energy) that is represented by 9 volts, state C (an electric vehicle is connected, is ready to accept energy, and indoor charging area ventilation is not required) that is represented by 6 volts, state D (an electric vehicle is connected, ready to accept energy, and indoor charging area ventilation is required) that is represented by 3 volts, state E (the EVSE is disconnected, utility power is not available, or other EVSE problem) that is represented by 0 volts, and state F (EVSE is not available, or other EVSE problem) that is represented by −12 volts.

The connector 110 is used to connect the EVSE 105 to electric vehicles. In one embodiment, the connector 110 is compliant with the SAE J1772 standard. The connector 110 includes five contacts (1, 2, 3, 4, 5). Contacts 1 and 2 are used for the AC power lines L1 and L2 respectively, contact 3 is used for the equipment ground, contact 4 is used for the control pilot signal, and contact 5 is used for proximity detection. The connector 110 includes the proximity switch 140, which is typically mechanically linked to a latch release actuator of the connector (not shown in FIG. 1). The proximity switch 140 is normally closed at all times except when the connector latch release actuator is actuated to decouple the connector from the vehicle inlet 115.

Figure 3:
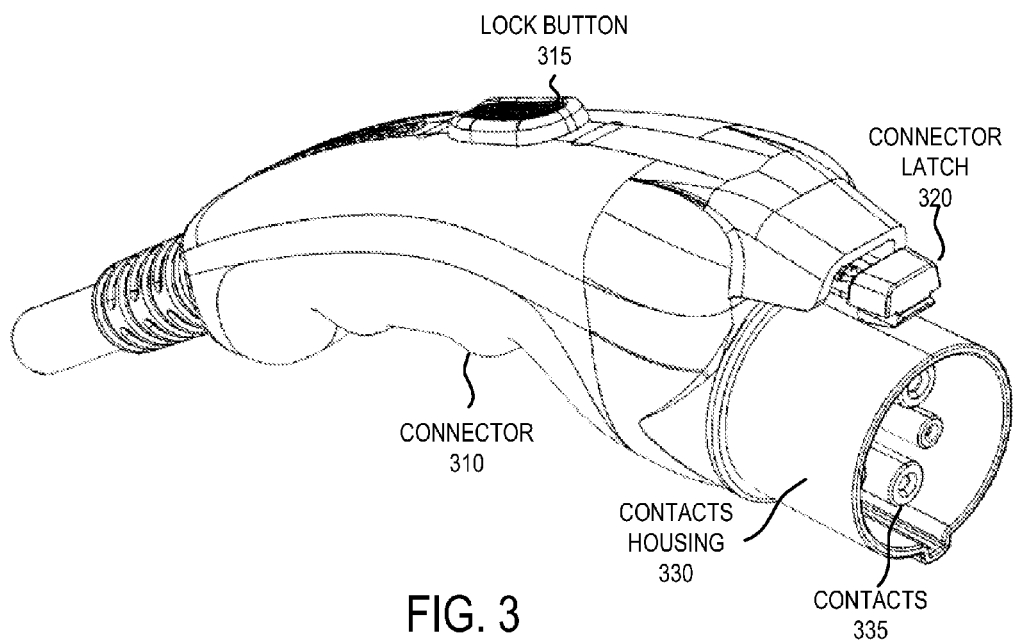
FIG. 3 illustrates an exemplary connector that can be used in embodiments of the invention.
Figure 4:
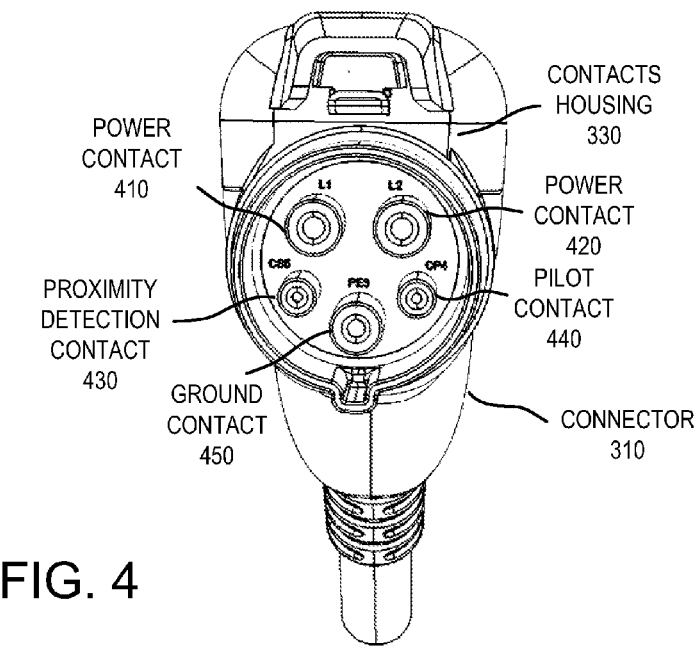
FIG. 4 illustrates a different view of the connector of FIG. 3.

FIG. 3 illustrates an exemplary connector that can be used in embodiments of the invention. The connector 310 includes the lock button 315 which controls latching and unlatching of the connector latch 320. With respect to FIG. 1, the proximity switch 140 is mechanically linked to the lock button 315 such that the proximity switch 140 is actuated when the lock button 315 is depressed. The connector 310 also includes the contacts housing 330 that houses the contacts 335. FIG. 4 illustrates a different view of the connector of FIG. 3 that shows the contacts 335 in more detail. In particular, the contacts 335 include the power contacts 410 and 420, the proximity detection contact 430, the pilot contact 440, and the ground contact 450.

The electric vehicle 120 includes the on-board charging system 150 that includes a charger component that supplies the power to the battery 152 and any other equipment required to condition and transfer energy from the constant frequency, constant supply voltage supply network to the direct current, variable voltage battery bus for the purposes of charging the battery 152.

The electric vehicle 120 also includes the pilot level-control circuitry 154 and the proximity detection circuitry 156. The proximity detection circuitry 156 detects when the proximity switch 140 is actuated (as a result of the connector latch release actuator being actuated) and causes the pilot level-control circuitry 154 to change the voltage of the pilot signal to signal the control electronics 132 to open the contactors 130 to remove charging voltage from the connector 110. As a result, the subsequent removal of the connector 110 from the vehicle inlet 115 induces no arcing due to the absence of voltage and current at the contacts of the connector 110.

The pilot level-control circuitry 154 and the proximity detection circuitry 156 are independent of any power supply, detection circuits, or control logic within the on-board charging system 150. The design of the electric vehicle 120 can be retrofitted with the pilot level-control circuitry 154 and the proximity detection circuitry 156 for minimal expense without changing the existing on-board charging system 150. In an alternative embodiment, the pilot level-control circuitry 154 and the proximity detection circuitry 156 can be incorporated into an original design of the on-board charging system 150.

By way of a specific example, when the connector 110 is connected to the vehicle inlet 115 and the proximity switch 140 is in the inactive (normally closed) position, the pilot level-control circuitry 154 causes the voltage of the pilot signal to be 6 volts, which signals to the EVSE 105 the state C as described above. As a result of the proximity detection circuitry 156 detecting that the proximity switch 140 has been actuated, the pilot level-control circuitry 154 causes the voltage of the pilot signal to be 9 volts, which signals to the EVSE 105 the state B, which causes the contactors 130 of the EVSE 105 to open thereby removing charging voltage from the connector 110.

Figure 2:
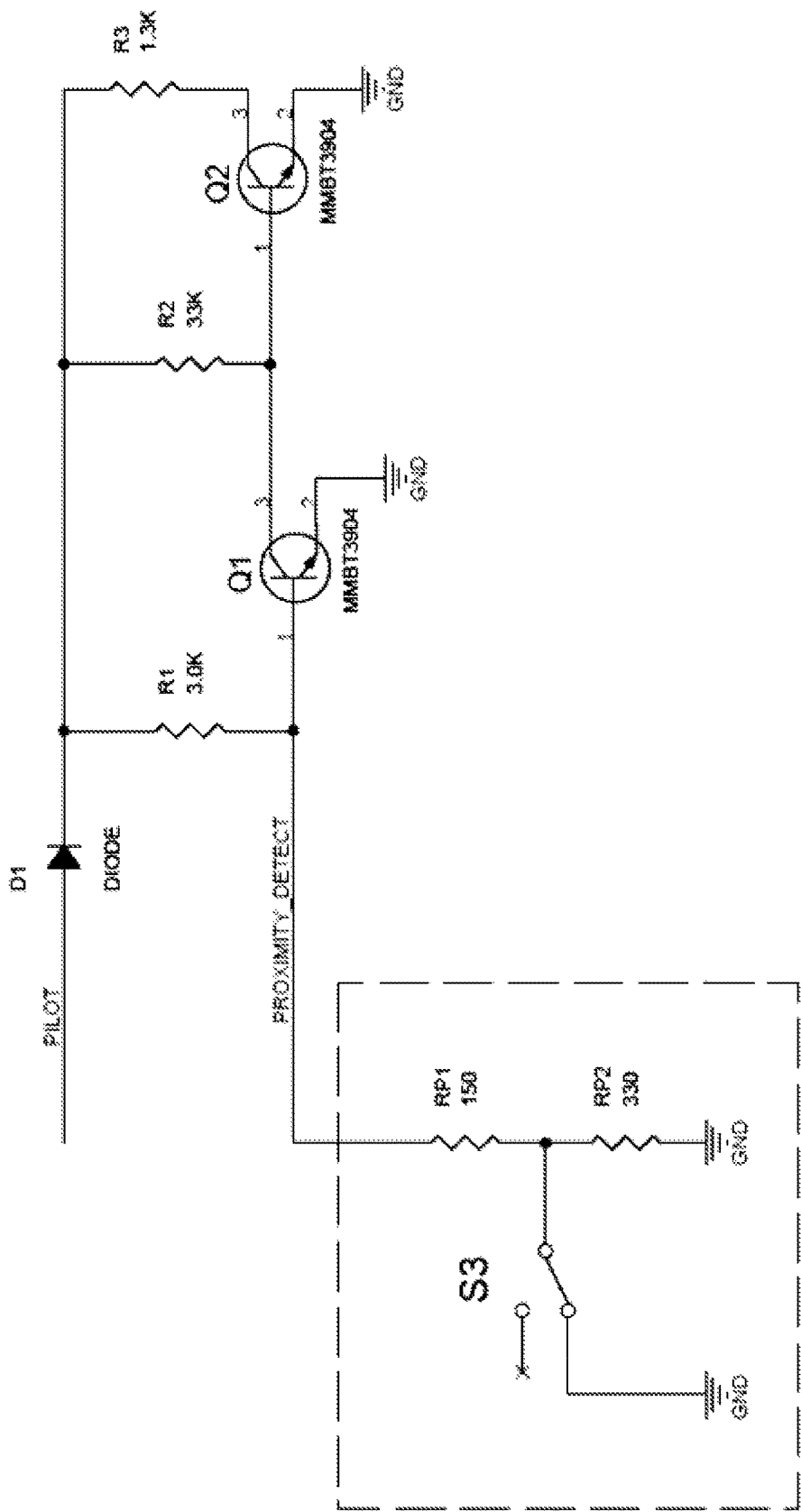
FIG. 2 illustrates an exemplary proximity detection and pilot level-control circuit according to one embodiment.

FIG. 2 illustrates an exemplary proximity detection and pilot level-control circuit according to one embodiment. The proximity switch S3 (which, for example, corresponds with the proximity switch 140 of FIG. 1) and the associated resistors RP1 and RP2 are contained within the connector, such as a J1772 compliant connector. The remaining components (the diode D1, the resistors R1, R2, R3, and the transistors Q1 and Q2) are contained within the electric vehicle. With respect to FIG. 1, the transistors Q1 and Q2 are part of the proximity detection circuitry 156. The transistors Q1 and Q2, working together with the resistors R1-R3, are part of the pilot level-control circuitry 154.

When the proximity switch S3 is in the inactive (normally-closed) position, the voltage divider R1 and RP1 does not allow the transistor Q1 to turn on. As a result, on each positive pilot signal excursion, transistor Q2 will turn on, connecting the load resistor R3 to the pilot signal. The values of the resistors R1 and R3 are chosen to create a 6 volt pilot signal level in such a case, which signals SAE J1772 state C (as described above) thereby allowing charging voltage and current to flow from the EVSE to the electric vehicle.

When the proximity switch S3 is actuated (typically as a result of the latch release actuator of the connector being actuated), the voltage divider R1 and (RP1 and RP2) will turn on the transistor Q1, which will in turn prevent transistor Q2 from turning on. The value of resistor R1 is such that the voltage of the pilot signal will be 9 volts, which signals SAE J1772 state B, which commands the EVSE to open its contactors and remove charging voltage from the connector. As a result, the subsequent removal of the connector from the electric vehicle inlet induces no arcing due to the absence of voltage and current at the contacts of the connector.

Figure 5:
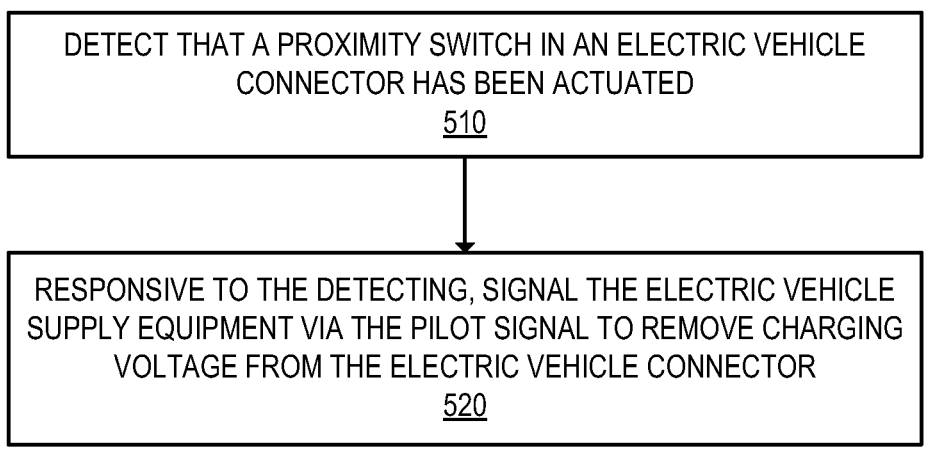
FIG. 5 is a flow diagram illustrating exemplary operations for controlling an electric vehicle pilot signal level for connector disconnect according to one embodiment.

FIG. 5 is a flow diagram illustrating exemplary operations for controlling an electric vehicle pilot signal level for connector disconnect according to one embodiment. At operation 510, a proximity switch in an electric vehicle connector has been detected as being actuated. For example, with reference to FIG. 1, the proximity detection circuitry 156 detects that the proximity switch 140 has been actuated. Next, at operation 520, responsive to the detection, the EVSE is signaled, via the pilot signal, to remove the charging voltage from the electric vehicle connector. For example, with reference to FIG. 1, the pilot level-control circuitry 154 changes the voltage of the pilot signal thereby signaling the control electronics 132 of the EVSE 105 to open its contactors 130 thereby removing the charging voltage from the connector 110.

Unlike the exemplary proximity detection circuit illustrated in SAE J1772 which requires a separate 5 volt power supply (see FIG. 8 of SAE J1772), a separate power supply is not needed for the proximity detection and the pilot level-control circuit described herein.

While FIG. 1 illustrates AC Level 2 charging, embodiments of the invention described herein are applicable to other types of charging (e.g., AC Level 1 charging).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. An apparatus in an electric vehicle for controlling an electric vehicle pilot signal level, comprising:
   proximity detection circuitry for detecting when a proximity switch in an electric vehicle connector is actuated; and
   pilot level-control circuitry for signaling an electric vehicle supply equipment coupled with the electric vehicle to remove charging voltage from the electric vehicle connector responsive to the proximity detection circuitry detecting that the proximity switch in the electric vehicle connector is actuated.

2. The apparatus of claim 1, wherein the proximity detection circuitry and the pilot level-control circuitry are independent of an on-board charging system of the electric vehicle.

3. The apparatus of claim 1, wherein the proximity switch is mechanically linked to a latch release actuator of the electric vehicle connector.

4. The apparatus of claim 1, wherein the signaling the electric vehicle supply equipment to remove charging voltage from the electric vehicle connector causes the electric vehicle supply equipment to open one or more contactors to remove the charging voltage from the electric vehicle connector.

5. The apparatus of claim 1, wherein the signaling the electric vehicle supply equipment to remove charging voltage from the electric vehicle connector includes changing voltage of the electric vehicle pilot signal.

6. The apparatus of claim 5, wherein changing voltage of the electric vehicle pilot signal includes changing the voltage of the electric vehicle pilot signal to 9 volts.

7. A method in an electric vehicle for controlling an electric vehicle pilot signal level, wherein the electric vehicle is coupled with an electric vehicle supply equipment, the method comprising:
   detecting that a proximity switch in an electric vehicle connector has been actuated; and
   responsive to the step of detecting, signaling, via the electric vehicle pilot signal, that the electric vehicle supply equipment is to remove charging voltage from the electric vehicle connector.

8. The method of claim 7, wherein detecting that the proximity switch in the electric vehicle connector has been actuated is performed independent of an on-board charging system of the electric vehicle.

9. The method of claim 7, wherein the proximity switch is mechanically linked to a latch release actuator of the electric vehicle connector.

10. The method of claim 7, wherein the signaling that the electric vehicle supply equipment is to remove charging voltage from the electric vehicle connector causes the electric vehicle supply equipment to open one or more contactors to remove the charging voltage from the electric vehicle connector.

11. The method of claim 7, wherein the signaling the electric vehicle supply equipment to remove charging voltage from the electric vehicle connector includes changing voltage of the electric vehicle pilot signal.

12. The method of claim 11, wherein changing voltage of the electric vehicle pilot signal includes changing the voltage of the electric vehicle pilot signal to 9 volts.

13. An apparatus in an electric vehicle for controlling an electric vehicle pilot signal level, comprising:
   a means for detecting when a proximity switch in an electric vehicle connector is actuated; and
   a means for signaling, via the electric vehicle pilot signal, that an electric vehicle supply equipment coupled with the electric vehicle is to remove charging voltage from the electric vehicle connector responsive to detecting that the proximity switch in the electric vehicle connector is actuated.

14. The apparatus of claim 13, wherein the means for detecting and the means for signaling are independent of an on-board charging system of the electric vehicle.

15. The apparatus of claim 13, wherein the proximity switch is mechanically linked to a latch release actuator of the electric vehicle connector.

16. The apparatus of claim 13, wherein the signaling that the electric vehicle supply equipment is to remove charging voltage from the electric vehicle connector causes the electric vehicle supply equipment to open one or more contactors to remove the charging voltage from the electric vehicle connector.

17. The apparatus of claim 13, wherein the signaling the electric vehicle supply equipment to remove charging voltage from the electric vehicle connector includes changing voltage of the electric vehicle pilot signal.

18. The apparatus of claim 17, wherein changing voltage of the electric vehicle pilot signal includes changing the voltage of the electric vehicle pilot signal to 9 volts.

* * * * *